(12) United States Patent
Hager

(10) Patent No.: US 6,204,805 B1
(45) Date of Patent: *Mar. 20, 2001

(54) DUAL TARGET TRACKING ALTIMETER

(75) Inventor: James R. Hager, Golden Valley, MN (US)

(73) Assignee: Honeywell Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,287

(22) Filed: Feb. 6, 1998

(51) Int. Cl.[7] .................................................. G01S 13/10
(52) U.S. Cl. ............................................................ 342/120
(58) Field of Search .................................. 342/120, 121, 342/122, 123

(56) References Cited

U.S. PATENT DOCUMENTS

| | | | |
|---|---|---|---|
| 3,611,370 | * 10/1971 | Frasure et al. | 342/120 |
| 4,174,520 | * 11/1979 | Westby | 342/120 |
| 4,495,500 | * 1/1985 | Vickers | 342/59 |
| 5,047,779 | * 9/1991 | Hager | 342/120 |
| 5,477,226 | * 12/1995 | Hager et all | 342/120 |
| 5,781,148 | * 7/1998 | Severwright | 342/120 |

FOREIGN PATENT DOCUMENTS

| 2751421 | 1/1998 | (FR) | G01S/13/52 |
|---|---|---|---|
| 2315941 | 2/1998 | (GB) | G01S/13/34 |

* cited by examiner

*Primary Examiner*—Ian J. Lobo
(74) *Attorney, Agent, or Firm*—Kris T. Fredrick

(57) ABSTRACT

The apparatus has the capability to detect the distance between an aircraft and the ground and at the same time to the nearest point to the aircraft such as buildings or trees. The apparatus includes an altimeter, determining the nearest point, as well as a device for determining the distance to the second target.

18 Claims, 5 Drawing Sheets

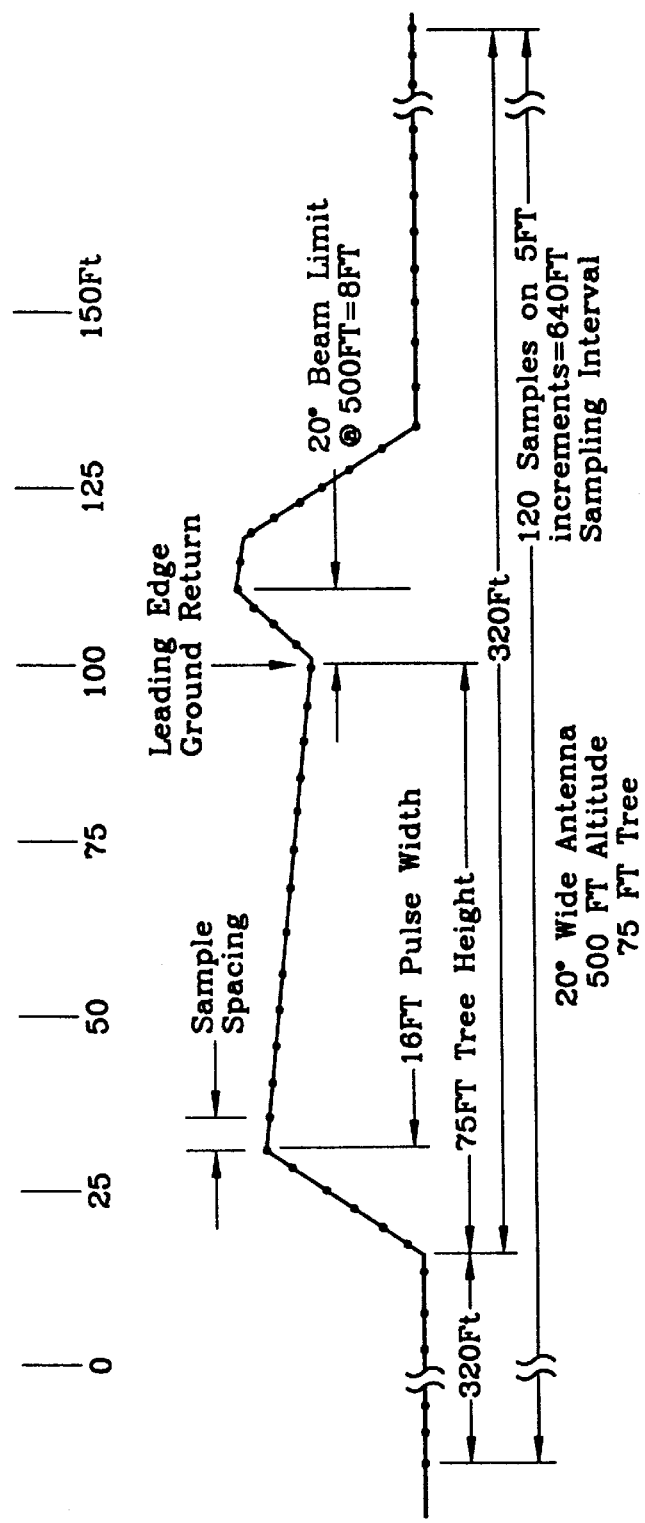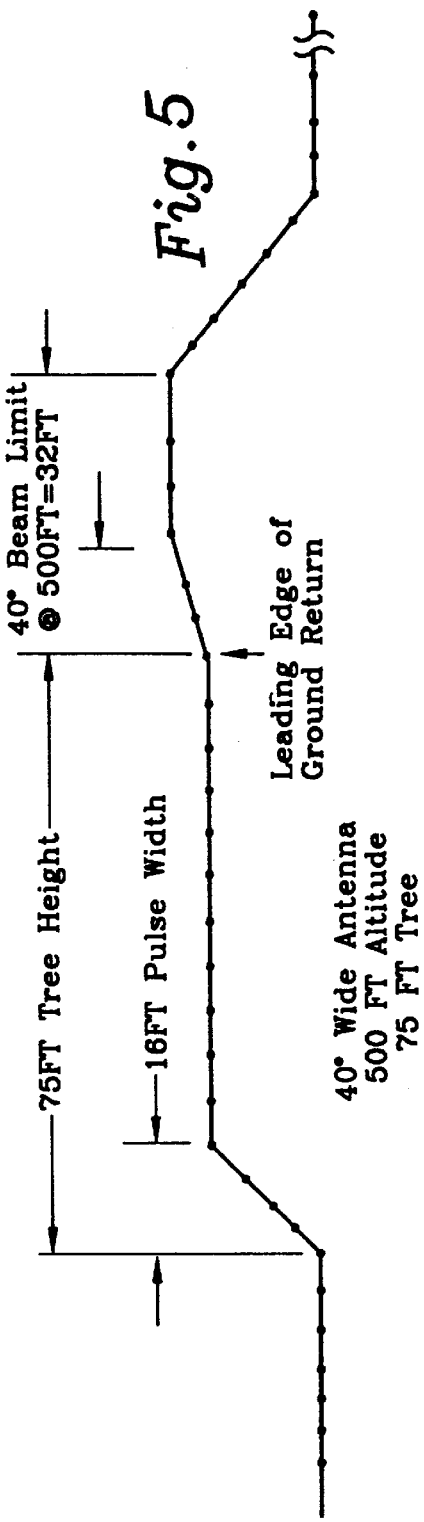
Fig. 5

DUAL TARGET TRACKING ALTIMETER

BACKGROUND OF THE INVENTION

Altimeters measure the altitude of an aircraft. The altimeter actually resides on the aircraft and a block diagram of an altimeter is shown in FIG. 1. In the operation of an altimeter 2, a pulse signal is typically transmitted at a rate of 1 pulse/100 $\mu$sec from the aircraft and a return signal is detected by an IF strip 4 in the altimeter 2 upon hitting the nearest point. FIG. 2 shows the return signal and the detection of the nearest point is designated by the leading edge of the return pulse. The return signal is amplified by an amplifier 6 in the altimeter 2 which is then processed by an altimeter processor 8 to determine the distance between the aircraft and the nearest point which is the altitude. The altitude is attained by determining the time between when the signal was sent and when the signal returned and multiplying the difference in time by the speed of light. Once the altitude is determined, the altitude is sent as a signal through a filter 10 to filter out noise and then the output is transmitted from the altimeter 2.

In actuality, the altimeter 2 only measures the distance between the aircraft and the nearest point rather than the actual altitude to the ground. For example, if a plane was flying over a forest, the altimeter would only measure the distance to the trees and not the ground. FIG. 3 shows what a return signal with trees might reveal. The first "edge" would represent the detection of the trees and the second "edge" would represent the ground.

In present radar altimeters, they are only capable of measuring the distance to the nearest point. The present altimeter can only measure the distance to the nearest point due to the processing within the altimeter processor 8. The altimeter processor 8 includes an integrator within a closed loop servo designed to control the position of a moveable radar range gate such that the gate encompasses only the first leading edge which is from the nearest point and not the second edge which is from the ground. Looking at FIG. 3, the shaded portion 12 designates the amount of the signal the gate passes while the rest of the signal is lost. As can be seen, a very small portion 12 of the entire signal is actually processed and the rest of the signal including the second "edge", which designates the ground, is never detected. Servo loops are well known in this area of technology and will not be discussed in any further detail here.

Before, there was only interest in determining the distance to the nearest point for safety issues in order to prevent the aircraft from crashing into the nearest point whether it was trees or the ground. As a result, the rest of the signal was not necessary for processing and the altimeter 2 was adequate for past purposes. However, presently, it is now necessary to determine the actual altitude of the aircraft as well as the nearest point to the aircraft. Therefore, it would be beneficial if an altimeter had the capability to determine the altitude of an aircraft as well as the distance from the aircraft and the nearest point for safety measures.

SUMMARY OF THE INVENTION

The present invention is an apparatus which has the capability to detect the distance between an aircraft and the ground as well as the nearest point to the aircraft such as buildings or trees. The apparatus includes an altimeter, determining the nearest point, as well as a device for determining the distance to the ground.

BRIEF DESCRIPTION OF THE DRAWINGS

FIG. 5 shows a restoration of the signal received by the altimeter after the signal was digitized.

DETAILED DESCRIPTION OF THE PRESENT INVENTION

Figure 1:
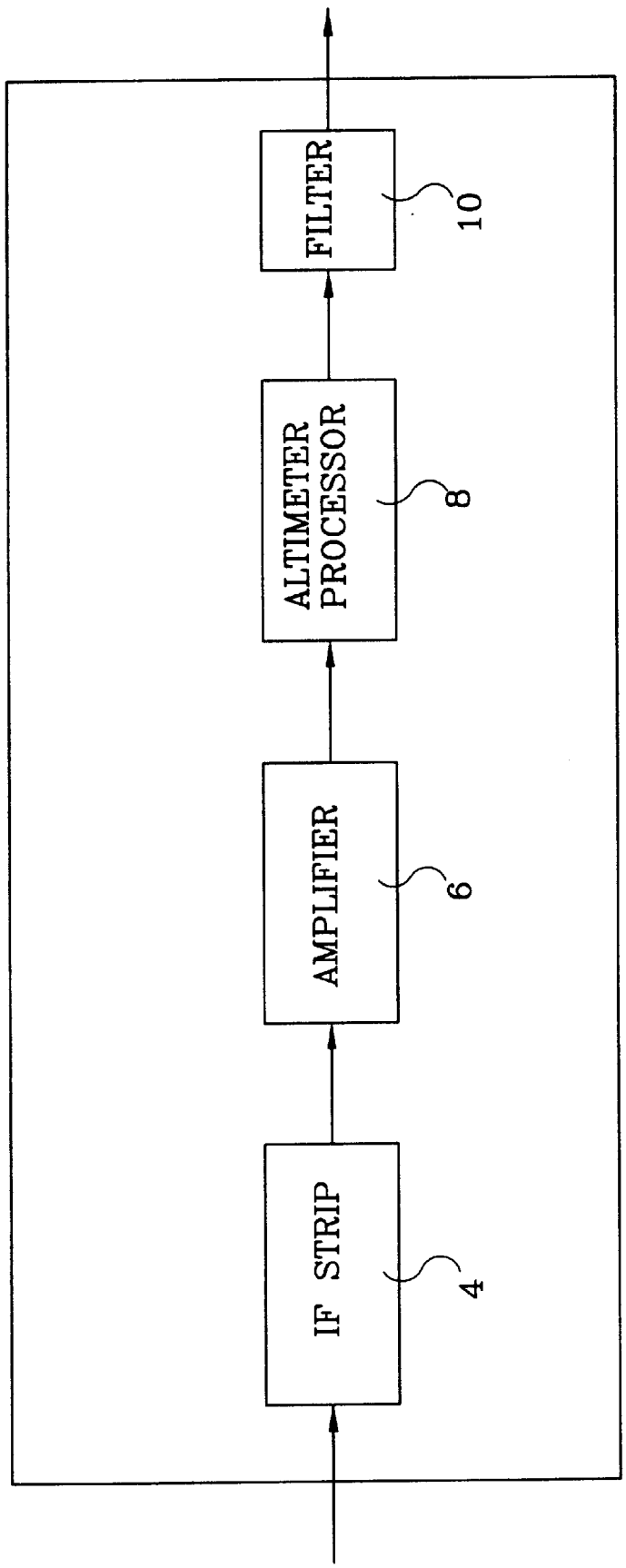
FIG. 1 shows a block diagram of an altimeter.
Figure 2:
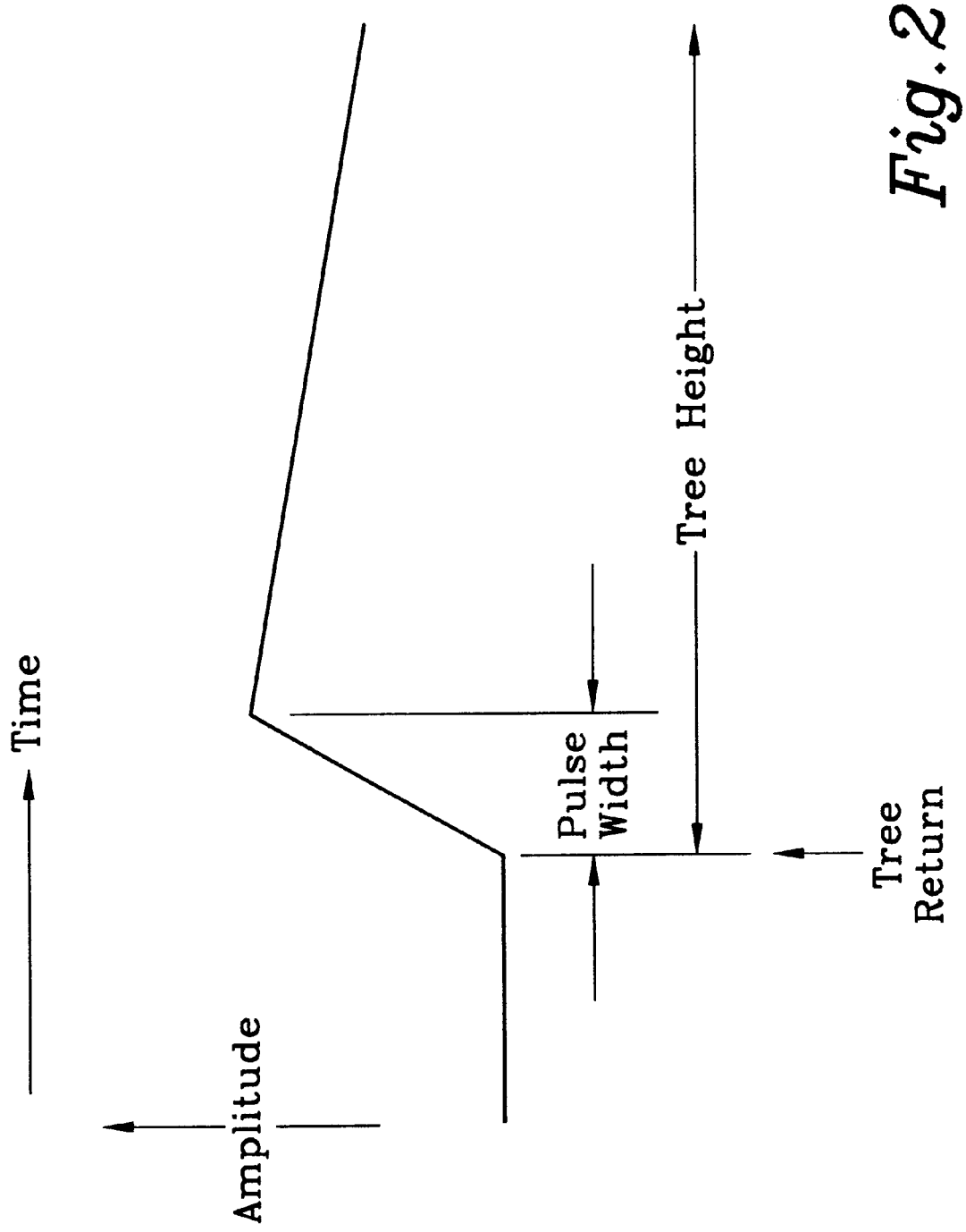
FIG. 2 shows the signal that is received by an altimeter designating the detection of an object.
Figure 3:
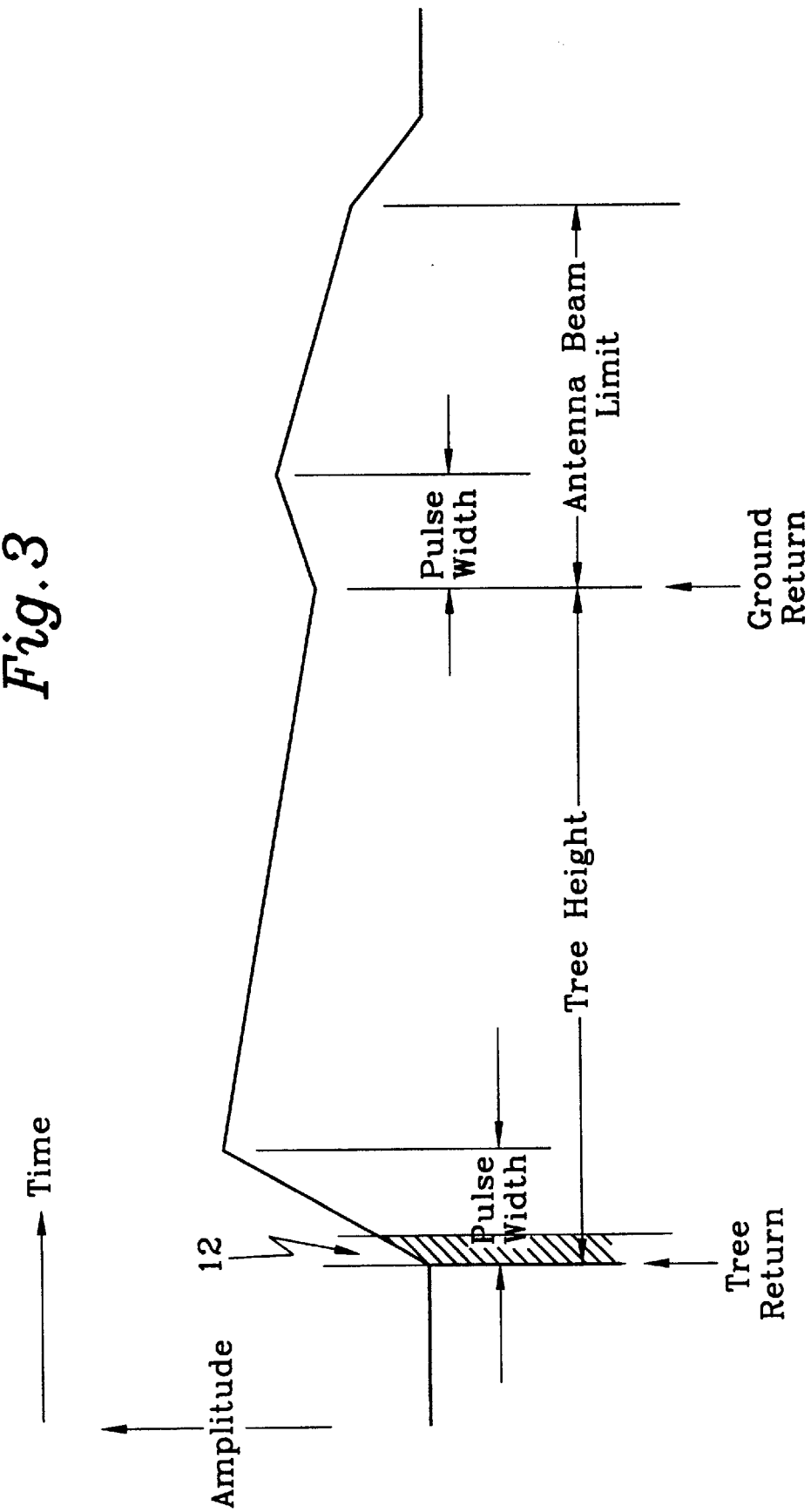
FIG. 3 shows the signal that is received by an altimeter designating the detection of the nearest object as well as a secondary object.
Figure 4:
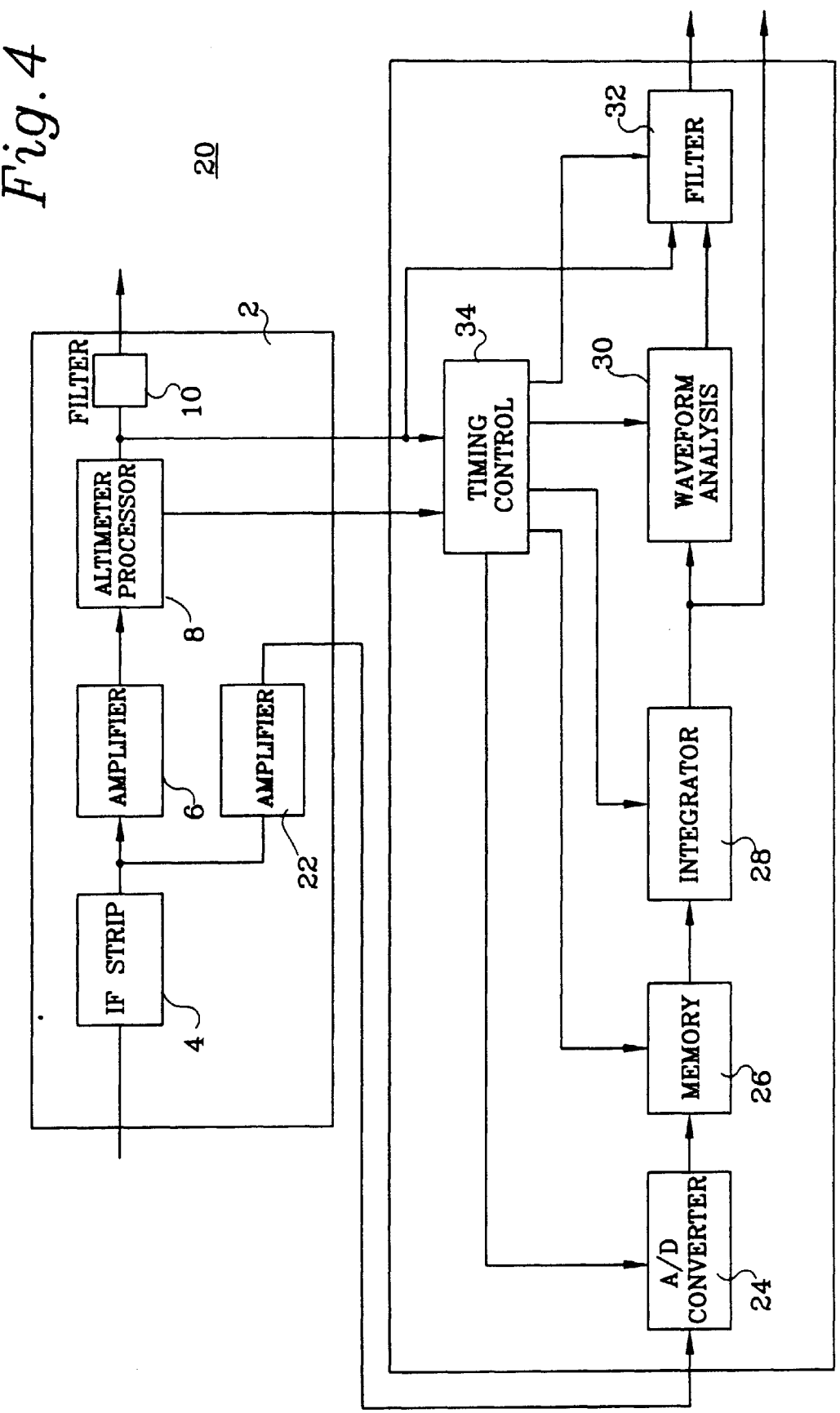
FIG. 4 shows a block diagram of the present invention.

The present invention solves the problem stated in the background of the invention. The altimeter 20 of the present invention has the capability to detect the distance to two targets meaning trees as well as the ground for example. The altimeter 20 of the present invention is shown in FIG. 4. Firstly, a second amplifier 22 is added to the original altimeter 2 from FIG. 1. This amplifier 22 amplifies the return signal which is shown in FIG. 3. The signal is then sent to A/D converter 24 which changes the signal from an analog signal to a digital signal. The A/D converter 24 samples at about 100 MHz resulting in samples every 10 nsec.

The sampled pulse is sent to a memory 26 which first stores the digital samples. In the 100 $\mu$sec interval between return signals, an integrator 28 retrieves the sampled pulse from the memory 26 and adds it to previous pulses to provide a signal to noise ratio sufficiently high to allow accurate processing which results in a signal which looks like FIG. 5. The above description describes the altimeter 20 of the present invention to be parts added to an already existing altimeter 2. This description is true if an already existing altimeter 2 existed in which additions were required to modify it 2 to become the altimeter 20 of the present invention. However, the altimeter 20 of the present invention could also be all one "box" which would be true if the altimeter 20 of the present invention was being manufactured without an already existing altimeter 2. The present invention 20 can be manufactured with either implementation.

Two signals are shown in FIG. 5 to show the difference in the signal depending on the size of the antenna sending out the signal. The top signal is from a 20 degree antenna beam and the bottom signal is from a 40 degree antenna beam. In the radar technology, time and radar distance are many times used synonymously. In FIG. 5, the present invention maintains 2 nsec equaling 1 radar ft. These values are used for example in the present invention only and other values may be used in the performance of the present invention.

A waveform analysis 30 determines the true altitude of the aircraft. If the ground is the first "edge", the altitude is already known and there are no trees. If the trees are the first "edge", the analysis 30 compares the time between the two "edges" and performs some simple analysis to determine the height from the second "edge" which is in this example the ground. Looking at the top waveform in FIG. 5 for example, the altitude height which the original altimeter detects is 500 ft. The altimeter creates the waveform and detects that the difference in time between the detection of the first "edge" and the detection of the second "edge" is 150 nsec which translates into 75 ft since 2 nsec equals 1 ft as stated above. Therefore, the height of the second "edge" is 575 ft and the true altitude is known. By subtracting the heights, the tree height is now known which is 75 ft.

In some cases when the trees are the first "edge", the first "edge" is not tracked by the altimeter 20. For example, the trees could be very sparse and only a small "edge" appears to which the altimeter range gate servo loop cannot respond. However, the present invention, digitally samples, with the A/D converter 24, the return waveform approximately three hundred feet before and after the tracked edge or return so that all returns will be processed when the waveform is integrated after being digitized. The same analysis performed above is performed again and the height of all the detected returns are determined. Again, the values used above are only an example of possible values that could, but are by no means limited to these values. The signal is then sent through a filter 32 to filter out noise and then the altitude signal is output. The distance from the aircraft to the second target is output as well.

Firstly, the Timing Control 34 controls when the altimeter 20 begins digitizing the radar return signal. The Timing Control 34 generates the control and command signals to move the radar return signal through the A/D converter 24 into the memory 26. The Timing Control 34 moves the signal to the integrator 28 for processing. The Timing Control 34 then moves the signal to analysis of the integrated waveform to determine the ranges and finally the Timing Control 34 moves the signal through the filter and output. The Timing Control also produces all the clock signals required to operate the operations. For example, a 100 MHz clock signal is required for the A/D converter 24.

All the components are well known in this area of technology and any components that can perform the specified operation can be used. Further, with the exception of the A/D converter 24, components 26, 28, 30, 32, 34 could be part of a processor, but again, the invention is not limited to the use of a processor but any components that perform the specified operations can be used. Also, all values stated in the above description are used only for operation of the preferred embodiment, but are in no way limited to these values. Different values could be used for example depending on the unique specifications one may be using the present invention.

The invention has been described herein in order to comply with the Patent Statutes and to provide those skilled in the art with the information needed to apply the novel principles and to construct and use such specialized components as are required. However, it is to be understood that the invention can be carried out by specifically different components, and that various modifications as to the component details can be accomplished without departing from the scope of the invention itself.

What is claimed is:

1. A method for determining a first distance and a second distance from an aircraft, wherein the first distance represents distance from the aircraft to a first target and the second distance represents distance from the aircraft to a second target, comprising in combination:

transmitting a pulse signal from the aircraft at a send time, wherein the pulse signal propagates at a first speed;

receiving a return signal at the aircraft, wherein the return signal includes a first return and a second return, wherein the first return is received at a first return time and includes a first leading edge corresponding to the pulse signal hitting the first target, and wherein the second return is received at a second return time and includes a second leading edge corresponding to the pulse signal hitting the second target;

determining the first distance by subtracting the first return time from the send time and multiplying by the first speed; and determining the second distance by subtracting the second return time from the send time and multiplying by the first speed.

2. The method of claim 1, further comprising:

converting the return signal into a plurality of sample pulses; and integrating at least a portion of the plurality of sample pulses to improve signal-to-noise ratio.

3. The method of claim 1, wherein the second distance is instead determined by the following steps:

subtracting the second return time from the first return time to obtain a difference;

multiplying the difference by the first speed to obtain a height; and adding the first distance to the height to obtain the second distance.

4. The method of claim 1, wherein the first target is nearer to the aircraft than the second target.

5. The method of claim 1, wherein the pulse signal is transmitted at an approximate rate of substantially one pulse every 100 microseconds.

6. The method of claim 2, wherein converting the return signal into the plurality of sample pulses includes sampling the return signal at an approximate rate of substantially one sample every 10 nanoseconds.

7. The method of claim 1, further comprising storing the plurality of sample pulses in a memory unit.

8. A method for modifying a conventional altimeter to be operable to determine a first distance and a second distance from an aircraft, wherein the first distance represents distance from the aircraft to a first target and the second distance represents distance from the aircraft to a second target, wherein the conventional altimeter includes at least an IF strip, a first amplifier, an altimeter processor, and a first filter, and wherein the conventional altimeter is operable to determine the first distance, the method comprising in combination:

providing a second amplifier operable to amplify a return signal from the IF strip, wherein the return signal includes a first return and a second return, wherein the first return is received at a first return time and includes a first leading edge corresponding to a pulse signal hitting the first target, and wherein the second return is received at a second return time and includes a second leading edge corresponding to the pulse signal hitting the second target;

providing an analog-to-digital converter operable to sample the return signal;

providing a memory unit operable to store the sampled return signal;

providing an integrator operable to integrate at least a portion of the plurality of sample pulses to improve signal-to-noise ratio;

providing a waveform analysis unit operable to determine the second distance by determining at least one difference among the first return time, the second return time, and a send time corresponding to the pulse signal being transmitted from the aircraft;

providing a second filter; and providing a timing control unit.

9. The method of claim 8, wherein the first target is nearer to the aircraft than the second target.

10. The method of claim 8, wherein the pulse signal is transmitted at an approximate rate of substantially one pulse every 100 microseconds.

11. The method of claim 8, wherein the return signal is sampled at an approximate rate of substantially one sample every 10 nanoseconds.

12. A system for determining a first distance and a second distance from an aircraft, wherein the first distance represents distance from the aircraft to a first target and the second distance represents distance from the aircraft to a second target, comprising in combination:

a transmitter operable to transmit a pulse signal from the aircraft at a send time, wherein the pulse signal propagates at a first speed;

a receiver operable to receive a return signal at the aircraft, wherein the return signal includes a first return and a second return, wherein the first return is received at a first return time and includes a first leading edge corresponding to the pulse signal hitting the first target, and wherein the second return is received at a second return time and includes a second leading edge corresponding to the pulse signal hitting the second target;

a processing unit operable to determine the first distance by subtracting the first return time from the send time and multiplying by the first speed and to determine the second distance by subtracting the second return time from the send time and multiplying by the first speed.

13. The system of claim 12, further comprising:

an analog-to-digital converter operable to convert the return signal into a plurality of sample pulses; and an integrator operable to integrate at least a portion of the plurality of sample pulses to improve signal-to-noise ratio.

14. The system of claim 12, wherein the processing unit instead determines the second distance by performing the following steps:

subtracting the second return time from the first return time to obtain a difference;

multiplying the difference by the first speed to obtain a height; and adding the first distance to the height to obtain the second distance.

15. The system of claim 12, wherein the first target is nearer to the aircraft than the second target.

16. The system of claim 12, wherein transmitter transmits the pulse signal at an approximate rate of substantially one pulse every 100 microseconds.

17. The system of claim 13, wherein the analog-to-digital converter samples the return signal at an approximate rate of substantially one sample every 10 nanoseconds.

18. The system of claim 12, further comprising a memory unit for storing the plurality of sample pulses.

* * * * *